United States Patent
Zheng et al.

(10) Patent No.: US 11,833,692 B2
(45) Date of Patent: Dec. 5, 2023

(54) METHOD AND DEVICE FOR CONTROLLING ARM OF ROBOT

(71) Applicant: UBTECH ROBOTICS CORP LTD, Shenzhen (CN)

(72) Inventors: Dake Zheng, Shenzhen (CN); Yizhang Liu, Shenzhen (CN); Zheng Xie, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 293 days.

(21) Appl. No.: 17/115,712

(22) Filed: Dec. 8, 2020

(65) Prior Publication Data
US 2021/0197379 A1 Jul. 1, 2021

(30) Foreign Application Priority Data

Dec. 30, 2019 (CN) .......................... 201911401000.1

(51) Int. Cl.
*B25J 9/16* (2006.01)
*G05B 19/4155* (2006.01)
*B25J 13/08* (2006.01)

(52) U.S. Cl.
CPC .......... *B25J 9/1666* (2013.01); *B25J 9/1605* (2013.01); *B25J 9/1643* (2013.01);
(Continued)

(58) Field of Classification Search
CPC . B25J 9/00; B25J 9/1602; B25J 9/1628; B25J 9/16; B25J 9/1666; B25J 9/1605;
(Continued)

(56) References Cited

U.S. PATENT DOCUMENTS

| 5,430,643 A | * | 7/1995 | Seraji | .................... B25J 9/1643 700/263 |
| 9,981,383 B1 | * | 5/2018 | Nagarajan | .............. B25J 9/1666 |
| 2017/0329321 A1 | * | 11/2017 | Dai | ......................... G05B 9/02 |

FOREIGN PATENT DOCUMENTS

| CN | 104392081 A | 3/2015 |
| CN | 105710888 A | 6/2016 |

(Continued)

OTHER PUBLICATIONS

Gao et al., An Approach for Task Priority Trajectory Planning of Redundant Robots, Mechanical Science and Technology for Aerospace Engineering, vol. 37 No. 1, Jan. 2018, China.

*Primary Examiner* — Khoi H Tran
*Assistant Examiner* — Sarah A Tran

(57) ABSTRACT

The present disclosure provides a method for controlling an arm of a robot, including obtaining obstacle information relating to the arm of the robot by at least one sensor, obtaining current posture information of the arm of the robot by a least one detector and obtaining an expected posture information of an end-portion of the arm of the robot, determining an expected trajectory of the end-portion of the arm of the robot, determining an expected speed of the end-portion of the arm of the robot in accordance with the expected trajectory of the end-portion, determining a virtual speed of a target point on the arm of the robot, and configuring a target join speed corresponding to a joint of the arm of the robot. Such that the redundant arm of the robot may be configured to prevent from contacting the obstacles in the complex environment while performing corresponding tasks.

17 Claims, 5 Drawing Sheets

(52) U.S. Cl.
CPC ........... *G05B 19/4155* (2013.01); *B25J 13/08* (2013.01); *G05B 2219/40269* (2013.01)

(58) Field of Classification Search
CPC ........ B25J 9/1643; B25J 9/1676; B25J 9/161; B25J 9/1656; B25J 9/1664; B25J 9/1674; B25J 13/00; B25J 13/08; B25J 13/088; B25J 13/089; G05B 19/00; G05B 19/02; G05B 19/18; G05B 19/4155; G05B 2219/00; G05B 2219/30; G05B 2219/40; G05B 2219/40269; G05B 2219/40367
USPC ........................................................ 700/253
See application file for complete search history.

(56) References Cited

FOREIGN PATENT DOCUMENTS

| | | | |
|---|---|---|---|
| CN | 109702744 A | * | 5/2019 |
| CN | 109702744 A | | 5/2019 |

* cited by examiner

METHOD AND DEVICE FOR CONTROLLING ARM OF ROBOT

CROSS REFERENCE TO RELATED APPLICATIONS

The present disclosure claims priority to Chinese Patent Application No. CN201911401000.1, filed Dec. 30, 2019, which is hereby incorporated by reference herein as if set forth in its entirety.

BACKGROUND

1. Technical Field

The present disclosure relates to robot field, and particularly to a method, device and terminal for controlling an arm of a robot.

2. Description of Related Art

With the evolution of arm of the robot technologies and the expansion of application scenarios, the requirements for operating capabilities of the arm of the robot are also increasing. Due to its better flexibility and adaptability, arm of the robots with redundant degrees of freedom (also called redundant arm of the robots) have been widely adopted in a variety of application scenarios.

However, with the increase of variety and complexity of application scenarios, redundant arm of the robots may need to perform tasks in a complex environment with various obstacles. Therefore, there is an urgent requirement for a method that may enable redundant arm of the robots to effectively avoid the obstacles in the complex environment while performing corresponding tasks.

BRIEF DESCRIPTION OF THE DRAWINGS

To describe the technical schemes in the embodiments of the present disclosure or in the prior art more clearly, the following briefly introduces the drawings required for the descriptions in the present disclosure. It should be understood that, the drawings in the following description merely show some embodiments of the present disclosure. For those skilled in the art, other drawings can be obtained according to the drawings without creative efforts.

DETAILED DESCRIPTION

In the following description, for the purpose of illustration rather than limitation, specific details such as a specific system structure and technology are proposed for a thorough understanding of the embodiments of the present disclosure. However, it should be clear to those skilled in the art that the present disclosure can also be implemented in other embodiments without these specific details. In other cases, detailed descriptions of well-known systems, devices, circuits, and methods are omitted to avoid unnecessary details from obstructing the description of this application.

It should be understood that when used in the specification and appended claims of this application, the term "comprising" indicates the existence of the described features, wholes, steps, operations, elements and/or components, but does not exclude one or more other The existence or addition of features, wholes, steps, operations, elements, components and/or their collections.

It should also be understood that the term "and/or" used in the specification and appended claims of this application refers to any combination of one or more of the items listed in the associated and all possible combinations, and includes these combinations.

As used in the description of this application and the appended claims, the term "if" may be interpreted as "when" or "once" or "in response to determination" or "in response to detecting." Similarly, the phrase "if determined" or "if detected (described condition or event)" may be interpreted depending on the context as meaning "once determined" or "in response to determination" or "once detected (described condition or event)" or "in response to detection of (condition or event described)."

The reference to "one embodiment" or "some embodiments" described in the specification of this application means that one or more embodiments of this application include a specific feature, structure, or characteristic described in combination with the embodiment. Therefore, the words "in one embodiment", "in some embodiments", "in some other embodiments", "in some other embodiments", etc. appearing in different places in this specification are not necessarily refer to the same embodiment, but mean "one or more but not all embodiments" unless it is specifically emphasized otherwise. The terms "including", "including", "having" and their variations all mean "including but not limited to" unless otherwise specifically emphasized.

Figure 1:
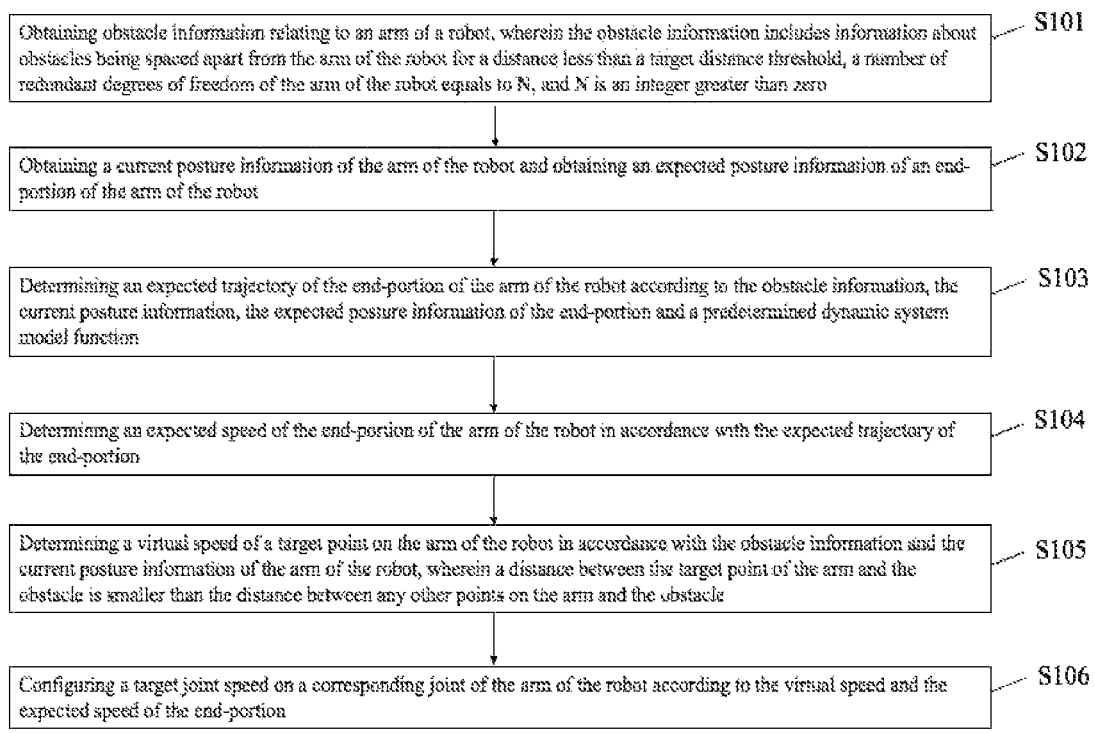
FIG. 1 is a flowchart of a method for controlling an arm of a robot in accordance with one embodiment of a present disclosure.

Specifically, FIG. 1 shows a flowchart of a method for controlling an arm of a robot in accordance with one embodiment of the present disclosure.

The method for controlling the arm of the robot in accordance with one embodiment of the present disclosure may be applied to the arm of the robot, and may also be applied to other terminals coupled to the arm of the robot. For example, it may be applied to robots, servers, mobile phones, tablets, and wearable devices, in-vehicle devices, augmented reality (AR) devices, virtual reality (VR) devices, laptops, ultra-mobile personal computers (UMPC), netbook computers, personal digital assistants (PDA) and other terminals to achieve the control of the arm of the robot. The embodiments of this disclosure do not impose any restrictions on the specific types of terminals.

Within the method for controlling the arm of the robot, the arm of the robot may have N number of redundant degrees of freedom and M number of joints, and the M number of joints respectively control the arm of the robot to move on the corresponding M number of degrees of freedom. N and M are integers greater than 0, and N is less than M.

In one embodiment of the present disclosure, the arm of the robot may have multiple degrees of freedom, such as four degrees of freedom, five degrees of freedom, six degrees of freedom, or seven degrees of freedom, and so on.

The redundant degree of freedom indicates the additional degrees of freedom of the arm of the robot when completing the specified operation. The movement of the arm of the robot along the direction in each degree of freedom may be accomplished by joints, and M number of joints respectively control the movement of the arm of the robot of the corresponding number of M degrees of freedom, and each joint may correspond to a degree of freedom. The joints may be connected in sequence, or several joints may be combined in one place. The joints may include one or more of multiple structural forms such as a rotating shaft, a linear shaft and a connecting rod. There may be multiple ways of configuring the joints, and there may also be multiple structural forms of the joints, which are not limited thereto. For example, the arm of the robot may have seven degrees of freedom. At this time, the arm of the robot may include seven joints, and the degrees of freedom of an end-portion of the arm of the robot may have six degrees of freedom, such as the degree of freedom of axial movement, the rotational movement along the x-axis, the linear movement along the y-axis, the rotational movement along the y-axis, the linear movement along the z-axis and the rotational movement along the z-axis. The degree of freedom of the arm of the robot is one more degree of freedom than the required degrees of freedom of the end-portion of the arm of the robot. Therefore, the arm of the robot may have a redundant degree of freedom with seven degrees of freedom.

Figure 2:
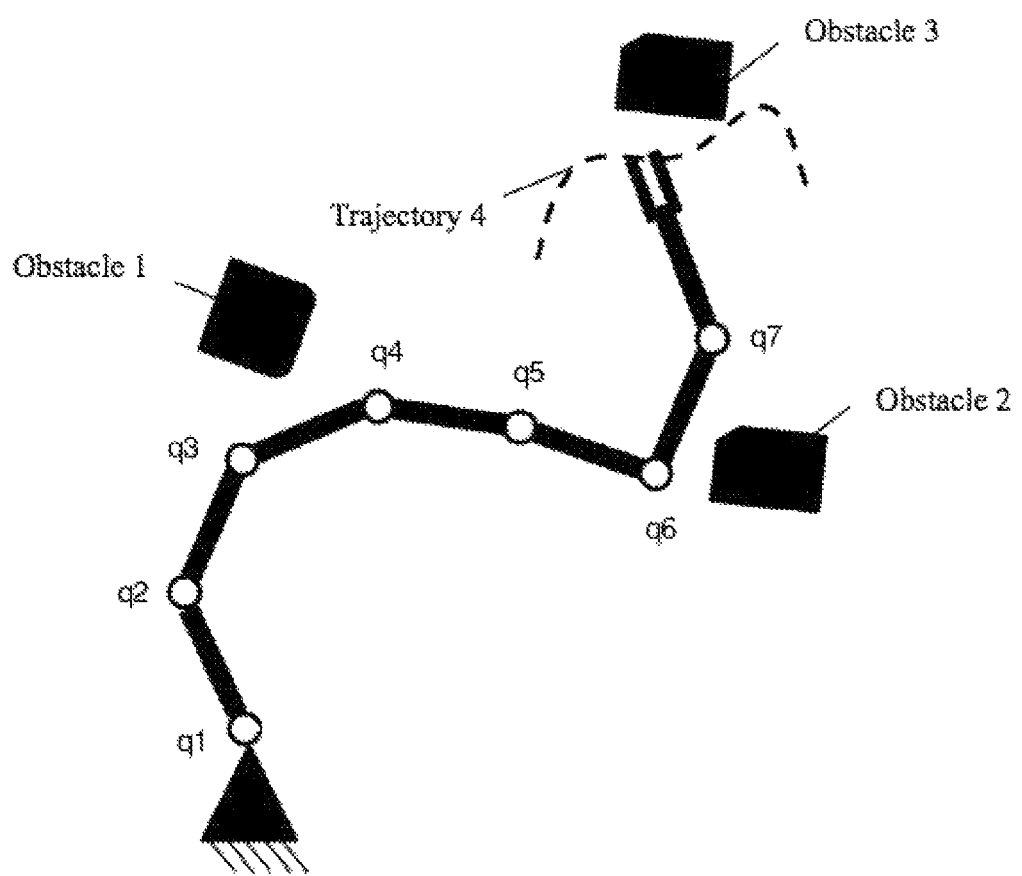
FIG. 2 is a schematic view of an application scenario of an arm of a robot in accordance with one embodiment of a present disclosure.
Figure 3:
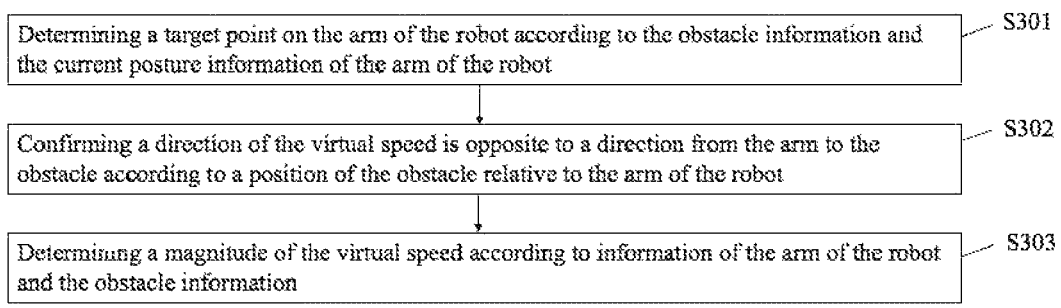
FIG. 3 is a flowchart illustrating step S105 of the method for controlling an arm of a robot in accordance with one embodiment of a present disclosure.
Figure 4:
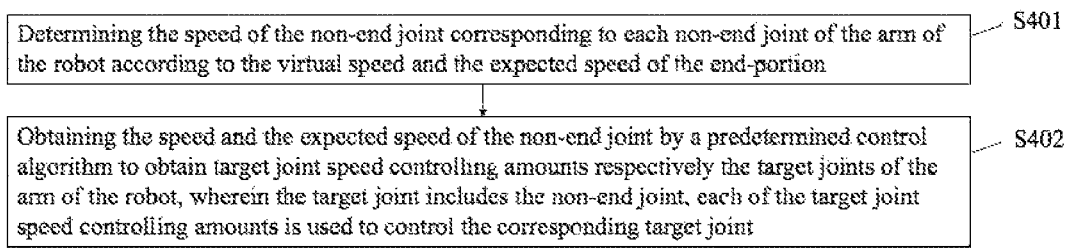
FIG. 4 is a flowchart illustrating step S106 of the method for controlling an arm of a robot in accordance with one embodiment of a present disclosure.

In one embodiment of the present disclosure, as shown in FIG. 2, FIG. 2 is schematic view of an application scenario of an arm of a robot in accordance with one embodiment of a present disclosure. The arm of the robot has one redundant degree of freedom and seven degrees of freedom, and q1, q2, q3, q4, q5, q6 and q7 are the seven joints of the arm of the robot. The obstacles relating to the arm of the robot include obstacle 1, obstacle 2 and obstacle 3. The trajectory 4 may be an end trajectory of the arm of the robot.

In other examples, the arm of the robot may have two, three or other values of the redundant degrees of freedom, and the specific structure of the arm of the robot is not limited herein.

As shown in FIG. 1, the method for controlling the arm of the robot includes the following steps.

Step S101: obtaining obstacle information relating to an arm of a robot, wherein the obstacle information includes information about obstacles being spaced apart from the arm of the robot for a distance less than a target distance threshold, a number of redundant degrees of freedom of the arm of the robot equals to N, and N is an integer greater than zero.

In one embodiments of the present disclosure, the obstacles relating to the arm of the robot may be specifically defined according to actual scenarios. For example, the obstacles relating to the arm of the robot may include the obstacles being spaced apart from the arm of the robot for a distance less than the target distance threshold. In addition, the obstacles relating to the arm of the robot may also include obstacles detected by the arm of the robot or other equipment relating to the arm of the robot, and obstacles which has a long distance from the arm of the robot but moves toward the arm of the robot with a fast moving speed. Therefore, the obstacle information relating to the arm of the robot may include information about obstacles being spaced apart from the arm of the robot for a distance less than the target distance threshold, but it is not be limited thereto.

There may be multiple ways to obtain the obstacle information. For example, it may be obtained through a specific data transmission method, such as wired transmission or wireless transmission, or it may be obtained by detecting, such as by a predetermined detection system.

In one example, the obstacle information may include one or more of obstacle speed parameter, obstacle size parameter and obstacle posture information, etc.

In some embodiments of the present disclosure, the step of obtaining obstacle information relating to an arm of a robot may further includes obtaining obstacle information relating to the arm of the robot through the predetermined detection system.

In one embodiment of the present disclosure, the devices of the predetermined detection system and the specific configuring methods of each device may be configured according to actual application scenarios. For example, the predetermined detection system may include one or more of a camera, an infrared sensor, an ultrasonic sensor and a laser sensor. The predetermined detection system may be at least partially configured on or around the arm of the robot.

Step S102: obtaining a current posture information of the arm of the robot and obtaining an expected posture information of an end-portion of the arm of the robot.

The current posture information of the arm of the robot may include current posture information of the end-portion of the arm of the robot and/or current posture information of the non-end portion end portion of the arm of the robot.

There may be multiple ways to obtain the current posture information. For example, it may be detected in real-time by one or more hardware modules, such as accelerometers, gyroscopes, cameras, infrared sensors, ultrasonic sensors, joint sensors, laser sensors, within the terminal in accordance with one embodiment of the present disclosure), or by predetermined specific data transmission methods, such as wired transmission or wireless transmission, from other terminals.

The expect posture information of the end-portion of the arm of the robot may include information relating an expected posture of an end-portion executor of the arm of the robot. The expected posture of the end-portion may be determined in accordance with the task currently to be performed by the arm of the robot. There may also be multiple specific methods for obtaining the expected posture information of the end-portion. For example, it may be obtained through predetermined specific data transmission methods, such as wired transmission or wireless transmission, from other terminals, or it may also be obtained according to current task information or instructions input by user.

Step S103: determining an expected trajectory of the end-portion of the arm of the robot according to the obstacle information, the current posture information, the expected posture information of the end-portion and a predetermined dynamic system model function.

In one embodiment of the present disclosure, the predetermined dynamical system (DS) model function may be used to represent the expected trajectory of the end-portion of the arm of the robot. There may be multiple specific calculation and derivation methods of the predetermined dynamic system model function, and the predetermined dynamic system model function may be obtained in advance according to existing or subsequent published methods.

In one embodiment, the formula form of the predetermined dynamic system model function may be derived from Gaussian Mixture Model (GMM) and related constraint conditions, and the parameters of predetermined dynamic system model function may be determined by demonstration. The demonstration may be the user controls the arm of the robot to perform the corresponding demonstration movement (also called kinesthetic demonstration), and the demonstration movement may be a pre-demonstration movement of the arm of the robot. The demonstration movement data that the arm of the robot executes the demonstration movement may be obtained, and the parameters of the predetermined dynamic system model function may be determined according to the demonstration movement data. Such that the predetermined dynamic system model function corresponding to the arm of the robot may be obtained. The same type of demonstration movement may be executed for multiple times. In one example, the user may control the arm of the robot to perform corresponding demonstration motions in the gravity compensation mode, such that when the user controls the arm of the robot, it may not be affected by the gravity caused by the weight of the arm of the robot, so as to reduce the control force conducting on the arm of the robot and to control the arm of the robot better.

In one embodiment of the present disclosure, an objective function representing a spatial state of the obstacles may be constructed according to the obstacle information.

The expected trajectory of the end-portion of the arm of the robot may be obtained by combining the objective function, the expected posture information of the end-portion, the current posture information of the arm of the robot with the predetermined dynamic system model function.

In one embodiment of the present disclosure, step S103 may further include: obtaining the objective function indicating the spatial state of the obstacle according to the obstacle information, determining the expected trajectory of the end-portion of the arm of the robot according to the objective function, the current posture information, the expected posture information of the end-portion and the predetermined dynamic system model function, wherein the expected trajectory of the end-portion may be configured to prevent the end-portion from being contacted with the obstacle.

The specific expression of the objective function may be determined according to an existing or subsequently generated algorithm. For example, the objective function may describe the space state of the obstacle by describing a curve, a two-dimensional plane, or a three-dimensional space.

In one embodiment of the present disclosure, the step of obtaining the objective function indicating the spatial state of the obstacle according to the obstacle information may include obtaining the objective function indicating the current spatial state of the obstacle according to the obstacle information including at least one of the obstacle posture information, the obstacle size parameter and the obstacle speed parameter. The objective function may be used to indicate the current spatial state of the obstacle, and may further indicate the change in the spatial state of the obstacle within a specified time period.

For example, the objective function may be expressed by $M(x-x0)$, where $x0$ may be the center point of the obstacle, and the predetermined dynamic system model function may be represented by $dx/dt=f(x)$. According to the objective function and the predetermined dynamic system model function, the expected trajectory of the end-portion of the arm of the robot may be obtained as $dx/dt=M(x-x0)f(x)$.

Step S104: determining an expected speed of the end-portion of the arm of the robot in accordance with the expected trajectory of the end-portion.

In one embodiment of the present disclosure, the expected speed of the end-portion may be the expected speed of end-portion of the arm of the robot in the Cartesian space, that is, the expected speed may be in a specific coordinate system.

Step S105: determining a virtual speed of a target point on the arm of the robot in accordance with the obstacle information and the current posture information of the arm of the robot, wherein a distance between the target point of the arm and the obstacle is smaller than the distance between any other points on the arm and the obstacle.

In one embodiment of the present disclosure, the point on the arm of the robot that has a distance smaller than the distance between any other points on the arm and the obstacle may be determined based on the obstacle information and the current posture information of the arm of the robot.

It should be noted that, in some examples, the target point may change in real-time. Therefore, in the step S105, the position of the target point may be determined in real-time, and the virtual speed of the target point may be determined in real-time. Therefore, the target point may be considered to be the closest point from the arm of the robot to the obstacle. In some examples, in order to reduce the amount of calculation, the target point on the arm of the robot and its virtual speed may be determined once within a certain time interval rather than a sampling period.

In one embodiment of the present disclosure, the step S105 may further includes the following steps.

Step S301: determining a target point on the arm of the robot according to the obstacle information and the current posture information of the arm of the robot.

Step S302: confirming a direction of the virtual speed is opposite to a direction from the arm to the obstacle according to a position of the obstacle relative to the arm of the robot.

Step S303: determining a magnitude of the virtual speed according to information of the arm of the robot and the obstacle information.

In one embodiment of the present disclosure, there are multiple ways to obtain the direction opposite to a direction from the arm to the obstacle. The angle between the direction indicating that the arm of the robot is away from the obstacle and the direction in which the target point points to the obstacle closest to the arm of the robot may be greater than 90 degrees. For example, in order to make the arm of the robot move away from the obstacle as fast as possible, such included angle may be 180 degrees. In some embodiments, other factors in the application scenarios may be considered, for example, the range of motion of the arm of the robot or other obstacles in the scene, such that the included angle may be between 90 degrees and 180 degrees.

In one embodiment of the present disclosure, the information of the arm of the robot may include at least one of structure information and performance information of the arm of the robot. The obstacle information may include at least one of obstacle speed parameter, obstacle size parameter, and obstacle posture information. The magnitude of the virtual speed may be determined according to the inherent properties of the arm of the robot and specific application scenarios. For example, if the speed threshold corresponding to each joint speed of the arm of the robot is relatively large, and the distance between the obstacle and the arm of the robot is relatively short, the virtual speed may be relatively large. In some embodiments, the weight of each associated element, such as the speed of the obstacle, the size of the obstacle, the size of the arm of the robot, that determines the magnitude of the virtual speed may be configured in advance. The calculation formula for the magnitude of the virtual speed may be established according to the weight and the relationship between each associated element and the magnitude of the virtual speed, so as to determine the magnitude of the virtual speed according to the information of each associated element. There may be multiple specific ways for determining the size of the virtual speed.

Step S106: configuring a target joint speed on a corresponding joint of the arm of the robot according to the virtual speed and the expected speed of the end-portion.

The target joint may include the non-end joint and/or end joint. In some examples, after determining the speed of the target joint of the arm of the robot, the corresponding target joint may be controlled to perform the full body obstacle avoidance process of the arm of the robot, and the executor of the end-portion may also complete the corresponding tasks.

In one embodiment of the present disclosure, since the arm of the robot has redundant degrees of freedom, the virtual speed may be used to characterize the redundant degrees of freedom of the arm of the robot. Further, the speed of the non-end joint of the arm of the robot may be obtained by using the kinematics method and the null space of the arm of the robot in accordance with virtual speed and the expected speed of the end-portion.

In some embodiments, after obtaining the speed of the non-end joint, the speed of the non-end joint and the expected speed of the end-portion may be processed by a specific control algorithm, such as a proportional integral differentiation (PID) control algorithm, to obtain the speed of the target joints respectively corresponding each of the target joints. The speed of each target joint may be used to control the target joint, that is, the speed of the target joint may consider to be as the speed controlling amount of the target joint.

In one embodiment of the present disclosure, the step S106 may further include the following steps.

Step S401: determining the speed of the non-end joint corresponding to each non-end joint of the arm of the robot according to the virtual speed and the expected speed of the end-portion.

Step S402: obtaining the speed and the expected speed of the non-end joint by a predetermined control algorithm to obtain target joint speed controlling amounts respectively the target joints of the arm of the robot, wherein the target joint includes the non-end joint, each of the target joint speed controlling amounts is used to control the corresponding target joint.

In some embodiments, the speed of the non-end joint and the expected speed of the end-portion may deviate from the actual control value of the target joint. Therefore, the predetermined control algorithm may be used to process to obtain the target joint speed controlling amounts respectively corresponding to each target joint when controlling each of the target joints. The predetermined control algorithm may be determined according to actual requirements. For example, the predetermined control algorithm may be the PID control algorithm.

It should be noted that the steps S105 and S106 of the present disclosure may be executed in real-time along with the sampling period, such that the speed of the target joint of each target joint of the arm of the robot may be determined in real-time, and the arm of the robot may perform a real-time obstacle avoidance process.

In some embodiments, before determining the expected trajectory of the end-portion of the arm of the robot according to the obstacle information, the current posture information, the expected posture information of the end-portion and a predetermined dynamic system model function, the method further includes the following steps.

Obtaining a pre-demonstration trajectory parameter of the end-portion and a pre-demonstration speed parameter of the end-portion when the arm of the robot performs the pre-demonstration motion; obtaining a predetermined dynamic system model function of the arm of the robot based on Gaussian mixture model according to the pre-demonstration trajectory parameter of the end-portion and the pre-demonstration speed parameter of the end-portion.

In some embodiments of the present disclosure, the pre-demonstration movement may be achieved by a user controlling the arm of the robot to move. The process of controlling the arm of the robot to perform the pre-demonstration movement by the user may also be referred to as teaching. The user may operate the arm of the robot to complete specific tasks. The pre-demonstration movement corresponding to the same task may be executed multiple times.

There may be multiple ways to obtain the pre-demonstration trajectory parameter of the end-portion and the pre-demonstration speed parameter of end-portion. For example, it may be detected by a predetermined detection system. After obtaining the pre-demonstration trajectory parameter of the end-portion and the pre-demonstration speed parameter of the end-portion, the parameters of the predetermined dynamic system model function may be determined according to the pre-demonstration trajectory parameter of end-portion and the pre-demonstration speed parameter of the end-portion, thereby determining the predetermined dynamic system model function corresponding to the arm of the robot.

In some embodiments, the step of determining the expected speed of the end-portion of the arm of the robot according to the expected trajectory of the end-portion may further include the following steps.

Determining the change of the expected speed of the end-portion of the arm of the robot along with a sampling period according to the expected trajectory of the end-portion; determining the expected speed of the end-portion of the arm of the robot in real-time according to the change of the expected speed of the end-portion of the arm of the robot with the sampling period.

The step of determining the virtual speed of the target point on the arm of the robot according to the obstacle information and the current posture information of the arm of the robot may further include the following steps.

Determining the current posture information of the arm of the robot in real-time; determining the target point on the arm of the robot and the virtual speed of the target point in real-time according to the obstacle information and the current posture information of the arm of the robot in real-time.

The step of determining the speed of the corresponding target joint of the arm of the robot according to the virtual speed and the expected speed of the end-portion may further include the following step.

Determining the speed of the corresponding target joint of the arm of the robot in real-time according to the expected speed of the end-portion of the robot and the virtual speed in real-time.

In one embodiment of the present disclosure, since the expected trajectory of the end-portion of the arm of the robot may correspond to the dynamic movement process of the arm of the robot, therefore, the changes of the expected speed of the end-portion of the robot may be determined along with the sampling period. The dynamic movement process may be determined by the executor of the end-portion of the arm of the robot based on the expected trajectory of the end-portion.

After determining the change of the expected speed of the end-portion of the arm of the robot along with the sampling period, the current posture information of the arm of the robot may be determined in real-time during the dynamic movement of the arm of the robot, so as to determine the target point on the arm of the robot and the virtual speed of the target point. The speed of the target joint corresponding to the target joint of the arm of the robot in real-time according to the expected speed of the end-portion of the arm of the robot and the virtual speed in real-time, so as to perform the obstacle avoidance process of the arm of the robot in real-time.

In one embodiment of the present disclosure, the obstacle information relating to the arm of the robot is obtained, wherein the obstacle information includes information about the obstacles being spaced apart from the arm of the robot for a distance less than the target distance threshold. The current posture information of the arm of the robot and the expected posture information of the end-portion of the arm of robot is obtained, so as to determine the expected trajectory of the end-portion of the arm of the robot in accordance with the obstacle information, the current posture information the expected posture information of the end-portion and the predetermined dynamics system model function. The expected trajectory of the end-portion of the arm of the robot may guide the executor of the end-portion to avoid obstacles while completing corresponding tasks. In addition, according to the obstacle information and the current posture information of the arm of the robot, the virtual speed of the target point on the arm of the robot may be determined. The virtual speed may represent the redundant freedom of the arm of the robot. Therefore, the target joint speed corresponding to the target joint of the arm of the robot may be obtained through the virtual speed and the expected speed of the end-portion, and the motion of each target joint may be controlled by applying the target joint speed. Such that the executor of the end-portion and the non-end-portion of the redundant arm of the robot may be configured to prevent the end-portion from being contacted with obstacles in the application environment while performing corresponding tasks.

It should be understood that the size of the sequence number of each step in the foregoing embodiment does not mean the order of execution. The execution sequence of each process should be determined by its function and internal logic, and should not constitute any limitation on the implementation process of the embodiment of the present application.

Figure 5:
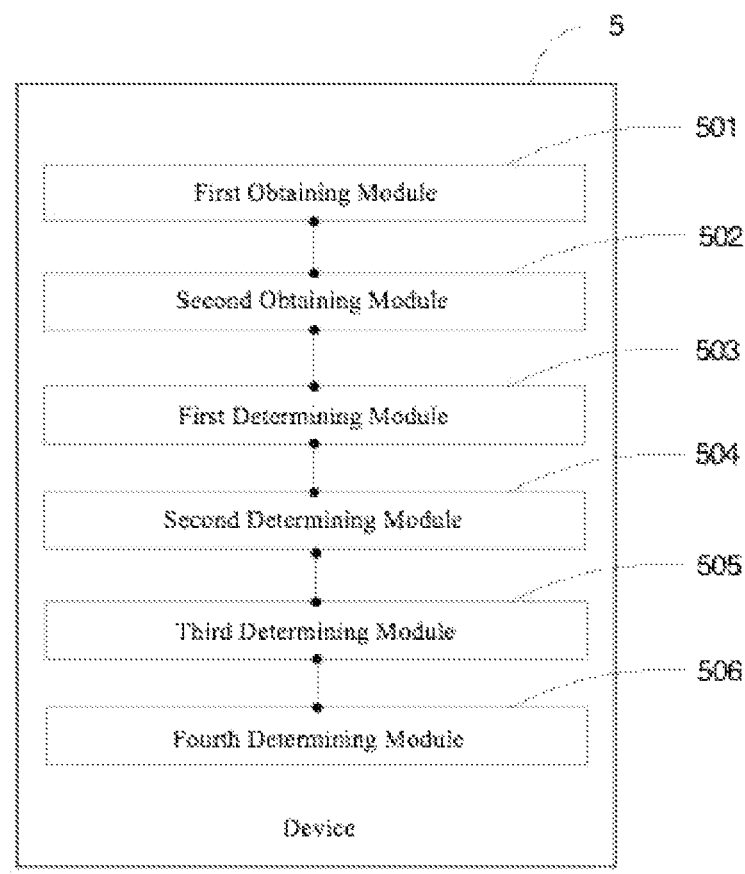
FIG. 5 is a schematic view of a device for controlling an arm of a robot in accordance with one embodiment of a present disclosure.

Corresponding to the method for controlling the arm of the robot described in above, FIG. 5 illustrates a schematic view of a device for controlling an arm of a robot in accordance with one embodiment of a present disclosure. For ease of explanation, only the information relating to the embodiment of the present disclosure is shown.

Referring to FIG. 5, a device 5 for controlling the arm of the robot includes a first obtaining module 501, a second obtaining module 502, a first determining module 503, a second determining module 504, a third determining module 505 and a fourth determining module 506.

The first obtaining module 501 is configured to obtain obstacle information relating to an arm of a robot, wherein the obstacle information includes information about obstacles being spaced apart from the arm of the robot for a distance less than a target distance threshold, a number of redundant degrees of freedom of the arm of the robot equals to N, and N is an integer greater than zero.

The second determining module 504 is configured to obtain a current posture information of the arm of the robot and obtain an expected posture information of an end-portion of the arm of the robot.

The first determining module 503 is configured to determine an expected trajectory of the end-portion of the arm of the robot according to the obstacle information, the current posture information, the expected posture information of the end-portion and predetermined dynamic system model function.

The second determining module 504 is configured to determine an expected speed of the end-portion of the arm of the robot in accordance with the expected trajectory of the end-portion.

The third determining module 505 is configured to determine a virtual speed of a target point of the arm of the robot in accordance with the obstacle information and the current posture information of the arm of the robot, wherein the target point is a point on the arm of the robot has a distance between the target point of the arm and the obstacle being smaller than the distance between any other points on the arm and the obstacle.

The fourth determining module 506 is configured to configure target joint speed on a corresponding target joint of the arm of the robot according to the virtual speed and the expected speed of the end-portion.

In one example, the first obtaining module 501 is configured to obtain obstacle information relating to the arm of the robot through the predetermined detection system.

In one example, the third determining module 505 may include a first determining unit, a second determining unit and a third determining unit.

The first determining unit is configured to determine a target point on the arm of the robot according to the obstacle information and the current posture information of the arm of the robot.

The second determining unit is configured confirm a direction of a virtual speed is a direction of the arm of the robot opposite to a direction from the arm to the obstacle according to a position of the obstacle relative to the arm of the robot.

The third determining unit is configured to determine a magnitude of the virtual speed according to arm of the robot information and the obstacle information.

In one example, the device 5 may further include a third determining module and a processor.

The third determining module is configured to obtain a pre-demonstration trajectory parameter of the end-portion and a pre-demonstration speed parameter of the end-portion when the arm of the robot performs the pre-demonstration motion.

The processor is configured to obtain a predetermined dynamic system model function of the arm of the robot based on Gaussian mixture model according to the pre-demonstration trajectory parameter of the end-portion and the pre-demonstration speed parameter of the end-portion.

In one example, the first determining module 503 may include a first processor and a fourth determining unit.

The first processor is configured to obtain an objective function indicating the spatial state of the obstacle according to the obstacle information.

The fourth determining unit is configured to determine the expected trajectory of the end-portion of the arm of the robot according to the objective function, the current posture information, the expected posture information of the end-portion and the predetermined dynamic system model function, wherein the expected trajectory of the end-portion may be configured to prevent the end-portion from being contacted with the obstacle.

In one example, the second determining unit 504 may include a fifth determining unit and a sixth determining unit.

The fifth determining unit is configured to determine the change of the expected speed of the end-portion of the arm of the robot along with a sampling period according to the expected trajectory of the end-portion.

The sixth determining unit is configured to determine the expected speed of the end-portion of the arm of the robot in real-time according to the change of the expected speed of the end-portion of the arm of the robot with the sampling period.

In one example, the third determining module 505 may include a seventh determining unit and a eighth determining unit.

The seventh determining unit is configured to determine the current posture information of the arm of the robot in real-time.

The eighth determining unit is configured to determine the target point on the arm of the robot and the virtual speed of the target point in real-time according to the obstacle information and the current posture information of the arm of the robot in real-time.

The fourth determining module 506 may include a ninth determining unit and a second processor.

The ninth determining unit is configured to determine the current posture information of the arm of the robot in real-time.

The second processor is configured to determine the target point on the arm of the robot and the virtual speed of the target point in real-time according to the obstacle information and the current posture information of the arm of the robot in real-time.

In one embodiment of the present disclosure, the obstacle information relating to the arm of the robot is obtained, wherein the obstacle information includes information about the obstacles being spaced apart from the arm of the robot for a distance less than the target distance threshold. The current posture information of the arm of the robot and the expected posture information of the end-portion of the arm of robot is obtained, so as to determine the expected trajectory of the end-portion of the arm of the robot in accordance with the obstacle information, the current posture information the expected posture information of the end-portion and the predetermined dynamics system model function. The expected trajectory of the end-portion of the arm of the robot may guide the executor of the end-portion to avoid obstacles while completing corresponding tasks. In addition, according to the obstacle information and the current posture information of the arm of the robot, the virtual speed of the target point on the arm of the robot may be determined. The virtual speed may represent the redundant freedom of the arm of the robot. Therefore, the target joint speed corresponding to the target joint of the arm of the robot may be obtained through the virtual speed and the expected speed of the end-portion, and the motion of each target joint may be controlled by applying the target joint speed. Such that the executor of the end-portion and the non-end-portion of the redundant arm of the robot may be configured to prevent the end-portion from being contacted with obstacles in the application environment while performing corresponding tasks.

It should be noted that the information exchange and execution process between devices/units are based on the same concept as the method embodiments of this application. The specific functions and technical effects may be found in the method embodiments, and won't be repeat herein.

Those skilled in the art may clearly understand that for the convenience and conciseness of the description, only the division of the above-mentioned functional units and modules is merely an example. In practical applications, the above-mentioned functions may be allocated to different functional units and modules as required. Module completion means dividing the internal structure of the device into different functional units or modules to complete all or part of the functions described above. The functional units and modules in the embodiments may be integrated into one processor, or each unit may exist alone physically, or two or more units may be integrated into one unit. The above-mentioned integrated units may be hardware-based and may also be realized in the form of software functional unit. In addition, the specific names of the functional units and modules are only for the convenience of distinguishing each other, and are not used to limit the protection scope of the present disclosure. For the specific working process of the units and modules in the foregoing system, reference may be made to the corresponding process in the foregoing method embodiment, which is not repeated here.

Figure 6:
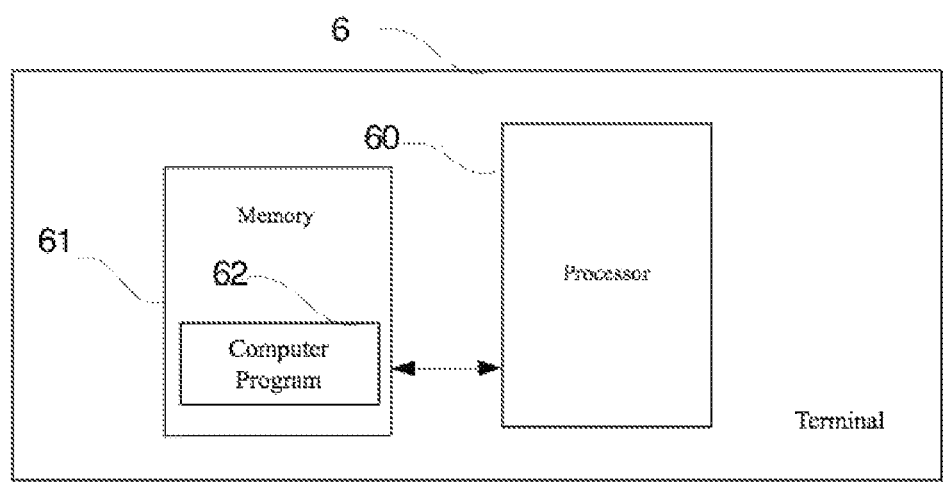
FIG. 6 is a schematic view of a terminal in accordance with one embodiment of a present disclosure.

FIG. 6 is a schematic view of a terminal in accordance with one embodiment of a present disclosure. As shown in FIG. 6, the terminal 6 may include at least one processor 60 (only one is shown in FIG. 6), a memory 61 and a computer program 62 that is stored in the memory 61 and is able to be executed by the at least one processor 60. The processor 60 may execute the computer program 62 to perform the steps in any of the foregoing embodiments of the arm of the robot in the method embodiment.

The terminal 6 may be a computing device such as a robot, an arm of a robot, a desktop, a notebook computer, a palmtop computer, and a cloud server. When the terminal 6 is a computing device, the terminal may include, but is not limited to, the processor 60 and the memory 61. Those skilled in the art may understand that FIG. 6 is only an example of the terminal 6 and does not constitute a limitation on the terminal 6. The terminal 6 may include more or less components than shown in FIG. 6, or a combination of certain components or different components. For example, the terminal 6 may also include input devices, output devices, network access devices, etc. The above-mentioned input device may include a touch panel, a fingerprint collection sensor (used to collect user fingerprint information and fingerprint orientation information), a microphone, a camera, etc., and the output device may include a display, a speaker, and the like.

The processor 60 may be a central processing unit (CPU), and the processor 60 may also be other general-purpose processors, digital signal processors (DSP), and application specific integrated circuits (ASIC), Field-Programmable Gate Array (FPGA) or other programmable logic devices, discrete gate or transistor logic devices, discrete hardware components, etc. The general-purpose processor may be a microprocessor or the processor can also be any conventional processor, etc.

The memory 61 may be an internal storage unit of the terminal 6 in some embodiments, such as a hard disk or memory of the terminal 6. In other embodiments, the memory 61 may also be an external storage device of the terminal 6, such as a plug-in hard disk, a smart memory card (SMC), and a secure digital (SD) card, flash card, etc. Further, the memory 61 may also include both an internal storage unit of the aforementioned terminal 6 and an external storage device. The memory 61 is used to store an operating system, an application program, a boot loader, data, and other programs, such as the program code of the computer program. The memory 61 may also be used to temporarily store data that has been output or will be output.

In addition, although not shown in the figure, the terminal 6 may also include a network connection module, such as a Bluetooth module, a Wi-Fi module, a cellular network module, etc., which will not be repeated here.

In the embodiment of the present disclosure, when the above-mentioned processor 60 executes the above-mentioned computer program 62 to implement the steps in any of the embodiments of the controlling method of the arm of the robot, it obtains obstacle information associated with the arm of the robot. The associated obstacle information includes information about obstacles being spaced apart from the arm of the robot for a distance less than the target distance threshold, obtains the current posture information of the arm of the robot, and obtains the expected posture information of the end-portion of the arm of the robot thereby. According to the obstacle information, the current posture information, the expected posture information of the end-portion and the predetermined dynamic system model function, the expected trajectory of the end-portion of the arm of the robot may be determined. The expected trajectory of the end-portion of the arm of the robot indicates that the executor of the end-portion of the arm of the robot may complete the corresponding task while avoiding obstacles. In addition, according to the obstacle information and the current posture information of the arm of the robot, the virtual speed of the target point on the arm of the robot may be determined. The virtual speed may represent the redundant freedom of the arm of the robot. Therefore, the target joint speed corresponding to the target joint of the arm of the robot may be obtained through the virtual speed and the expected speed of the end-portion, and the motion of each target joint may be controlled by applying the target joint speed. Such that the executor of the end-portion and the non-end-portion of the redundant arm of the robot may be configured to prevent the end-portion from being contacted with obstacles in the application environment while performing corresponding tasks.

In some embodiments of the present disclosure, a computer-readable storage medium is also provided, and the computer-readable storage medium stores a computer program. When the computer program is executed by a processor, the steps in the above-mentioned method embodiments may be realized.

In some embodiments of the present disclosure, a computer program product is provided. When the computer program product is executed on a terminal, the terminal may perform the steps in the method embodiments.

If the integrated unit is implemented in the form of the software functional unit and sold or used as an independent product, it may be stored in the computer readable storage medium. Based on this understanding, this application implements all or part of the processes in the above-mentioned embodiments and methods, which may be completed by instructing relevant hardware through the computer program. The above-mentioned computer program may be stored in the computer-readable storage medium. When executed by the processor, the steps of the foregoing method embodiments may be implemented. The computer program includes computer program code, and the computer program code may be in the form of source code, object code, executable file, or some intermediate forms. The computer-readable medium may at least include any entity or device capable of carrying computer program code to the photographing device/terminal, recording medium, computer memory, read-only memory (ROM), random access memory (RAM), electric carrier signal, telecommunication signal and software distribution medium, such as USB flash drive, mobile hard disk, floppy disk or CD-ROM, etc. In some jurisdictions, according to legislation and patent practices, computer-readable media cannot be electrical carrier signals and telecommunication signals.

The description of each embodiment has its own focus. For parts that are not detailed or recorded in an embodiment, reference may be made to related descriptions of other embodiments.

A person of ordinary skill in the art may realize that the units and algorithm steps of the examples described in combination with the embodiments disclosed herein can be implemented by electronic hardware or a combination of computer software and electronic hardware. Whether these functions are executed by hardware or software depends on the specific application and design constraints of the technical solution. Professionals and technicians can use different methods for each specific application to implement the described functions, but such implementation should not be considered beyond the scope of this disclosure.

In the embodiments provided in this disclosure, it should be understood that the disclosed apparatus/network equipment and method may be implemented in other ways. For example, the device/network device embodiments described above are merely illustrative. For example, the division of the modules or units is only a logical function division, and there may be other divisions in actual implementation, such as multiple units or components can be combined or integrated into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The units described above as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

The embodiments are only used to illustrate the technical solutions of the present disclosure, not to limit thereto. Although the present disclosure has been described in detail with reference to the foregoing embodiments, those of ordinary skill in the art should understand that they can still compare the foregoing embodiments. The recorded technical solutions are modified, or some of the technical features may be equivalently replaced, These modifications or replacements do not cause the essence of the corresponding technical solutions to deviate from the spirit and scope of the technical solutions of the embodiments of the disclosure, and should be included within the scope of protection.

What is claimed is:

1. A method for controlling an arm of a robot, comprising:
   obtaining obstacle information relating to the arm of the robot by at least one sensor, wherein the obstacle information comprises information relating to obstacles being spaced apart from the arm of the robot for a distance less than a target distance threshold, a number of redundant degrees of freedom of the arm of the robot equals to N, a number of joints of the arm of the robot equals to M, the M number of the joints of the arm of the robot respectively control the arm of the robot to move on corresponding M number of degrees of freedom, N is less than M, N and M are integers greater than zero, and the redundant degrees of freedom of the arm of the robot indicate additional degrees of freedom of the arm of the robot when completing an operation;

obtaining current posture information of the arm of the robot by a least one detector and obtaining an expected posture information of an end-portion of the arm of the robot;

determining an expected trajectory of the end-portion of the arm of the robot according to the obstacle information, the current posture information of the arm of the robot, the expected posture information of the end-portion and a predetermined dynamic system model function, wherein the obstacle information comprises an obstacle speed parameter, an obstacle size parameter, and obstacle posture information;

determining an expected speed of the end-portion of the arm of the robot in accordance with the expected trajectory of the end-portion;

determining a virtual speed of a target point on the arm of the robot in accordance with the obstacle information and the current posture information of the arm of the robot, wherein a distance between the target point of the arm and the obstacle is smaller than the distance between any other points on the arm and the obstacle; and configuring a target join speed corresponding to a joint of the arm of the robot in accordance with the virtual speed and the expected speed of the end-portion;

wherein the step of determining the expected trajectory of the end-portion of the arm of the robot according to the obstacle information, the current posture information, the expected posture information of the end-portion and a predetermined dynamic system model function further comprises:

obtaining an objective function indicating a spatial state of the obstacle according to the obstacle information; and determining the expected trajectory of the end-portion of the arm of the robot according to the objective function, the current posture information, the expected posture information of the end-portion and the predetermined dynamic system model function, wherein the expected trajectory of the end-portion is configured to prevent the end-portion from being contacted with the obstacles; and wherein the objective function is describe the spatial state of the obstacle by describing a curve, a two-dimensional plane, or a three-dimensional space, and the objective function is used to indicate a current spatial state of the obstacle, and a change in the spatial state of the obstacle within a specified time period.

2. The method of claim 1, wherein the step of obtaining obstacle information relating to the arm of the robot further comprises:

obtaining the obstacle information relating to the arm of the robot through a predetermined detection system.

3. The method of claim 2, wherein the predetermined detection system comprises one or more of a camera, an infrared sensor, an ultrasonic sensor and a laser sensor, and the predetermined detection system is at least partially configured on or around the arm of the robot.

4. The method of claim 1, wherein the step of determining a virtual speed of a target point on the arm of the robot in accordance with the obstacle information and the current posture information of the arm of the robot further comprises:

determining the target point on the arm of the robot according to the obstacle information and the current posture information of the arm of the robot;

confirming a direction of the virtual speed is opposite to a direction from the arm to the obstacle according to a position of the obstacle relative to the arm of the robot; and determining a magnitude of the virtual speed according to information of the arm of the robot and the obstacle information.

5. The method of claim 4, wherein an angle between the direction from the arm of the robot to the obstacle and a direction in which the target point point to the obstacle closest to the arm of the robot is between 90 degrees and 180 degrees.

6. The method of claim 1, wherein before the step of determining the expected trajectory of the end-portion of the arm of the robot according to the obstacle information, the current posture information, the expected posture information of the end-portion and a predetermined dynamic system model function, the method further comprises:

obtaining a pre-demonstration trajectory parameter of the end-portion and a pre-demonstration speed parameter of the end-portion when the arm of the robot performs the pre-demonstration motion;

obtaining a predetermined dynamic system model function of the arm of the robot based on Gaussian mixture model according to the pre-demonstration trajectory parameter of the end-portion and the pre-demonstration speed parameter of the end-portion.

7. The method of claim 1, wherein the step of determining an expected speed of the end-portion of the arm of the robot in accordance with the expected trajectory of the end-portion further comprises:

determining a change of the expected speed of the end-portion of the arm of the robot along with a sampling period according to the expected trajectory of the end-portion;

determining the expected speed of the end-portion of the arm of the robot in real-time according to the change of the expected speed of the end-portion of the arm of the robot with the sampling period;

wherein the step of determining a virtual speed of a target point on the arm of the robot in accordance with the obstacle information and the current posture information of the arm of the robot further comprises:

determining the current posture information of the arm of the robot in real-time;

determining the target point on the arm of the robot and the virtual speed of the target point in real-time according to the obstacle information and the current posture information of the arm of the robot in real-time;

wherein the step of configuring a target join speed corresponding to a joint of the arm of the robot in accordance with the virtual speed and the expected speed of the end-portion further comprises:

determining the target speed of the end-portion of the arm of the robot in real-time corresponding to the target joint in accordance with the virtual speed and the expected speed of the end-portion of the arm of the robot.

8. The method of claim 7, wherein the step of configuring a target join speed corresponding to a joint of the arm of the robot in accordance with the virtual speed and the expected speed of the end-portion further comprises:

determining a speed corresponding to a non-end joint of the arm of the robot according to the virtual speed and the expected speed of the end-portion;

obtaining the speed and an expected speed of the non-end joint by a predetermined control algorithm to obtain a controlling amount corresponding to the target joint of the arm of the robot, wherein the target joint comprises the non-end joint, and the controlling amount is used to control the corresponding target joint.

9. The method of claim 1, wherein the virtual speed is used to characterize the redundant degrees of freedom of the arm of the robot.

10. The method of claim 1, wherein the expect posture information of the end-portion of the arm of the robot comprises information relating an expected posture of an end-portion executor of the arm of the robot, and the expected posture of the end-portion executor of the arm of the robot is determined in accordance with a task currently to be performed by the arm of the robot.

11. The method of claim 1, wherein the current posture information of the arm of the robot comprises current posture information of the end-portion of the arm of the robot and current posture information of a non-end portion of the arm of the robot.

12. A device for controlling end-portions of a robot, wherein the device comprises:

a memory;

a processor; and one or more computer programs stored in the memory and executable on the processor, wherein the one or more computer programs comprise:

instructions for obtaining obstacle information relating to the arm of the robot by at least one sensor, wherein the obstacle information comprises information relating to obstacles being spaced apart from the arm of the robot for a distance less than a target distance threshold, a number of redundant degrees of freedom of the arm of the robot equals to N, a number of joints of the arm of the robot equals to M, the M number of the joints of the arm of the robot respectively control the arm of the robot to move on corresponding M number of degrees of freedom, N is less than M, N and M are integers greater than zero, and the redundant degrees of freedom of the arm of the robot indicate additional degrees of freedom of the arm of the robot when completing an operation;

instructions for obtaining current posture information of the arm of the robot by a least one detector and obtaining an expected posture information of an end-portion of the arm of the robot;

instructions for determining an expected trajectory of the end-portion of the arm of the robot according to the obstacle information, the current posture information of the arm of the robot, the expected posture information of the end-portion and a predetermined dynamic system model function, wherein the obstacle information comprises an obstacle speed parameter, an obstacle size parameter, and obstacle posture information;

instructions for determining an expected speed of the end-portion of the arm of the robot in accordance with the expected trajectory of the end-portion;

instructions for determining a virtual speed of a target point on the arm of the robot in accordance with the obstacle information and the current posture information of the arm of the robot, wherein a distance between the target point of the arm and the obstacle is smaller than the distance between any other points on the arm and the obstacle; and instructions for configuring a target join speed corresponding to a joint of the arm of the robot in accordance with the virtual speed and the expected speed of the end-portion;

wherein the instructions for determining the expected trajectory of the end-portion of the arm of the robot according to the obstacle information, the current posture information, the expected posture information of the end-portion and a predetermined dynamic system model function further comprises:

instructions for obtaining an objective function indicating a spatial state of the obstacle according to the obstacle information; and instructions for determining the expected trajectory of the end-portion of the arm of the robot according to the objective function, the current posture information, the expected posture information of the end-portion and the predetermined dynamic system model function, wherein the expected trajectory of the end-portion is configured to prevent the end-portion from being contacted with the obstacles; and wherein the objective function is describe the spatial state of the obstacle by describing a curve, a two-dimensional plane, or a three-dimensional space, and the objective function is used to indicate a current spatial state of the obstacle, and a change in the spatial state of the obstacle within a specified time period.

13. The device of claim 12, wherein the instructions for obtaining obstacle information relating to the arm of the robot further comprises:

instructions for obtaining the obstacle information relating to the arm of the robot through a predetermined detection system.

14. The device of claim 12, wherein the instructions for determining a virtual speed of a target point on the arm of the robot in accordance with the obstacle information and the current posture information of the arm of the robot further comprises:

instructions for determining the target point on the arm of the robot according to the obstacle information and the current posture information of the arm of the robot;

instructions for confirming a direction of the virtual speed is opposite to a direction from the arm to the obstacle according to a position of the obstacle relative to the arm of the robot; and instructions for determining a magnitude of the virtual speed according to information of the arm of the robot and the obstacle information.

15. The device of claim 12, wherein before the instructions for determining the expected trajectory of the end-portion of the arm of the robot according to the obstacle information, the current posture information, the expected posture information of the end-portion and a predetermined dynamic system model function, the method further comprises:

instructions for obtaining a pre-demonstration trajectory parameter of the end-portion and a pre-demonstration speed parameter of the end-portion when the arm of the robot performs the pre-demonstration motion;

instructions for obtaining a predetermined dynamic system model function of the arm of the robot based on Gaussian mixture model according to the pre-demonstration trajectory parameter of the end-portion and the pre-demonstration speed parameter of the end-portion.

16. The device of claim 12, wherein the instructions for determining an expected speed of the end-portion of the arm of the robot in accordance with the expected trajectory of the end-portion further comprises:
- instructions for determining a change of the expected speed of the end-portion of the arm of the robot along with a sampling period according to the expected trajectory of the end-portion;
- instructions for determining the expected speed of the end-portion of the arm of the robot in real-time according to the change of the expected speed of the end-portion of the arm of the robot with the sampling period;
- wherein the instructions for determining a virtual speed of a target point on the arm of the robot in accordance with the obstacle information and the current posture information of the arm of the robot further comprises:
- instructions for determining the current posture information of the arm of the robot in real-time;
- instructions for determining the target point on the arm of the robot and the virtual speed of the target point in real-time according to the obstacle information and the current posture information of the arm of the robot in real-time;
- wherein the instructions for configuring a target join speed corresponding to a joint of the arm of the robot in accordance with the virtual speed and the expected speed of the end-portion further comprises:
- instructions for determining the target speed of the end-portion of the arm of the robot in real-time corresponding to the target joint in accordance with the virtual speed and the expected speed of the end-portion of the arm of the robot.

17. The device of claim 16, wherein the instructions for configuring a target join speed corresponding to a joint of the arm of the robot in accordance with the virtual speed and the expected speed of the end-portion further comprises:
- instructions for determining a speed corresponding to a non-end joint of the arm of the robot according to the virtual speed and the expected speed of the end-portion;
- instructions for obtaining the speed and an expected speed of the non-end joint by a predetermined control algorithm to obtain a controlling amount corresponding to the target joint of the arm of the robot, wherein the target joint comprises the non-end joint, and the controlling amount is used to control the corresponding target joint.

* * * * *